United States Patent
Colignon

(10) Patent No.: US 7,549,285 B2
(45) Date of Patent: Jun. 23, 2009

(54) AUXILIARY SYSTEM FOR REGENERATING POLLUTION CONTROL MEANS INCORPORATED INTO THE EXHAUST LINE OF A DIESEL ENGINE FOR A MOTOR VEHICLE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 112 days.

(21) Appl. No.: 10/595,623

(22) PCT Filed: Oct. 1, 2004

(86) PCT No.: PCT/FR2004/002494

§ 371 (c)(1),
(2), (4) Date: May 1, 2006

(87) PCT Pub. No.: WO2005/049993

PCT Pub. Date: Jun. 2, 2005

(65) Prior Publication Data

US 2007/0017211 A1    Jan. 25, 2007

(30) Foreign Application Priority Data

Nov. 7, 2003    (FR) .................................. 03 13157

(51) Int. Cl.
  *F01N 3/00*    (2006.01)
(52) U.S. Cl. ............................. 60/297; 60/274; 60/285; 60/286; 60/295
(58) Field of Classification Search .................. 60/280, 60/285, 286, 295, 297, 303, 274
See application file for complete search history.

(56) References Cited

U.S. PATENT DOCUMENTS

| 4,655,037 | A  | * | 4/1987 | Rao ............................. 60/274 |
| 6,536,209 | B2 | * | 3/2003 | Fluga et al. .................... 60/284 |
| 6,574,956 | B1 |   | 6/2003 | Moraal et al. |
| 6,594,990 | B2 |   | 7/2003 | Kuenstler et al. |
| 6,598,387 | B2 | * | 7/2003 | Carberry et al. ............... 60/297 |
| 6,763,659 | B2 |   | 7/2004 | Watanabe et al. |
| 6,802,180 | B2 | * | 10/2004 | Gabe et al. .................... 60/285 |

(Continued)

FOREIGN PATENT DOCUMENTS

DE    19963930 A    7/2001

(Continued)

OTHER PUBLICATIONS

International Search Report dated Feb. 15, 2005.

(Continued)

*Primary Examiner*—Binh Q. Tran
(74) *Attorney, Agent, or Firm*—Nicolas E. Seckel

(57) ABSTRACT

The invention relates to a system for carrying out a regeneration strategy by means of at least one fuel post-injection into cylinders and is characterised in that the inventive system comprises means (11) for measuring a temperature downstream of catalyst forming means, means (8) for determining a maximum time for applying the post-injections during return to idling phases produced by lifting off and idling according to said temperature and means (7, 8) for immediately stopping the post-injection when the maximum time is attained during the idling phase and/or a progressively reducing the post-injection when the application time attains the maximum value during said idling phase.

16 Claims, 1 Drawing Sheet

U.S. PATENT DOCUMENTS

| | | |
|---|---|---|
| 6,931,842 B2 | 8/2005 | Ohtake et al. |
| 6,951,100 B2 | 10/2005 | Kuboshima et al. |
| 7,021,050 B2 | 4/2006 | Nishimura et al. |
| 7,062,906 B2 | 6/2006 | Otake et al. |
| 7,104,050 B2 | 9/2006 | Sato et al. |
| 7,137,247 B2 | 11/2006 | Koga et al. |
| 7,159,391 B2 * | 1/2007 | Kogo et al. ............. 60/297 |
| 7,237,379 B2 | 7/2007 | Nakano et al. |
| 2002/0007629 A1 | 1/2002 | Asanuma et al. |
| 2007/0130917 A1 * | 6/2007 | Colignon ................. 60/286 |

FOREIGN PATENT DOCUMENTS

| | | | |
|---|---|---|---|
| DE | 10007049 A | 8/2001 | |
| EP | 1174612 A | 1/2002 | |
| EP | 1176290 A | 1/2002 | |
| EP | 1234959 A | 8/2002 | |
| EP | 1281852 A | 2/2003 | |
| FR | 2805568 A | 8/2001 | |
| FR | 2831923 A | 5/2003 | |

OTHER PUBLICATIONS

Patent Abstracts of Japan vol. 2002, No. 12, Dec. 12, 2002 & JP 2002235590 of Aug. 23, 2002.

International Search Report dated Mar. 1, 2005 in PCT/FR2004/002514 (U.S. Appl. No. 10/595,635).

* cited by examiner

AUXILIARY SYSTEM FOR REGENERATING POLLUTION CONTROL MEANS INCORPORATED INTO THE EXHAUST LINE OF A DIESEL ENGINE FOR A MOTOR VEHICLE

BACKGROUND ART

The present invention relates to a system for regenerating depollution means associated with oxidation catalyst-forming means integrated in an exhaust line of a motor vehicle diesel engine.

More particularly, the invention relates to a system in which the engine is associated with common manifold or "rail" means for feeding fuel to the cylinders of the engine and adapted, at constant torque, to implement a strategy of regeneration by injecting fuel into the cylinders, in at least one post-injection operation.

During regeneration of depollution means such as, for example, a particle filter, stages during which the engine is idling (very low exhaust temperature) or during which the vehicle accelerator pedal is being raised (no injection of fuel in normal operation), are problematic since they cause a drop in the temperature of the exhaust, i.e. the exhaust line and the elements integrated therein.

The use of one or more post-injections during such stages in the operation of the engine makes it possible to limit the drop in the temperature of the exhaust line by relying on the catalytic conversion of the hydrocarbons (HCs) produced by the combustion of the post-injection(s) in the engine.

However, those strategies rely on the exothermic reaction produced by the catalyst-forming means, it being assumed that said means are active, where said means comprise, for example, an oxidation catalyst or a NOx trap with a carbon monoxide/hydrocarbon (CO/HC) oxidation function.

During stages in which the engine is returning to idling as a result of the accelerator pedal being raised, there is no main injection nor any pilot injection, so the or each post-injection does not burn in the cylinder, since post-injection merely causes the fuel to be vaporized in the form of HCs which are subsequently converted by the catalyst-forming means.

The inlet temperature of the oxidation catalyst-forming means is thus very low, and in spite of the exothermic catalytic reaction that is produced by the combustion of the HCs derived from the or each post-injection, the front face of the catalyst-forming means cools down progressively and its conversion activity becomes progressively deactivated.

While the engine is idling, in spite of using one or more post-injections, the temperature at the inlet to the catalyst-forming means is relatively low. The strategy of post-injection while idling also relies on the catalytic conversion of the HCs produced by the combustion of the post-injections into the engine. In spite of the catalytic reaction being exothermic, the front face of the catalyst-forming means cools down progressively and its conversion activity becomes progressively deactivated.

During the stage of returning to idling or a stage of prolonged idling, it can happen that the catalyst-forming means are thus no longer sufficiently active to convert all of the HCs, which leads to peaks of HCs downstream from the catalyst-forming means, and even to blue smoke and/or exhaust odors.

Furthermore, the use of post-injections leads to the lubricating oil being diluted with fuel, thereby degrading its lubrication properties, in particular reducing its viscosity, and if viscosity becomes too low, that can lead to damage to the engine.

SUMMARY OF THE INVENTION

The object of the invention is thus to solve these problems.

To this end, the invention provides a system for providing assistance in regenerating depollution means associated with oxidation catalyst-forming means integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one post-injection, the system being characterized in that it comprises:

- means for detecting a request for regeneration, and thus for post-injection;
- means for detecting a state in which the vehicle accelerator pedal is being raised or a stage in which the vehicle engine is idling;
- acquisition means for acquiring the temperature downstream from the catalyst-forming means;
- means for responding to said temperature to determine a maximum duration of post-injection application during stages in which the engine is returning to idling as a result of the accelerator pedal being raised and stages during which the engine is idling; and
- means for immediately interrupting the or each post-injection if the duration of post-injection utilization reaches the predetermined maximum duration of application during a stage of returning to idling, and/or for progressively reducing the or each post-injection when the duration of post-injection utilization reaches the predetermined maximum duration of application during a stage of the engine idling.

According to other characteristics:

- the reduction means are adapted to reduce the or each post-injection in application of a calibratable slope;
- the depollution means comprise a particle filter;
- the depollution means comprise a NOx trap;
- the fuel includes an additive for being deposited together with the particles with which it is mixed on the depollution means in order to facilitate regeneration thereof;
- the fuel includes an additive that forms a NOx trap; and
- the engine is associated with a turbocharger.

BRIEF DESCRIPTION OF THE DRAWINGS

The invention can be better understood on reading the following description given purely by way of example and made with reference to the accompanying drawing, in which.

DETAILED DESCRIPTION OF PARTICULAR EMBODIMENTS

Figure 1:
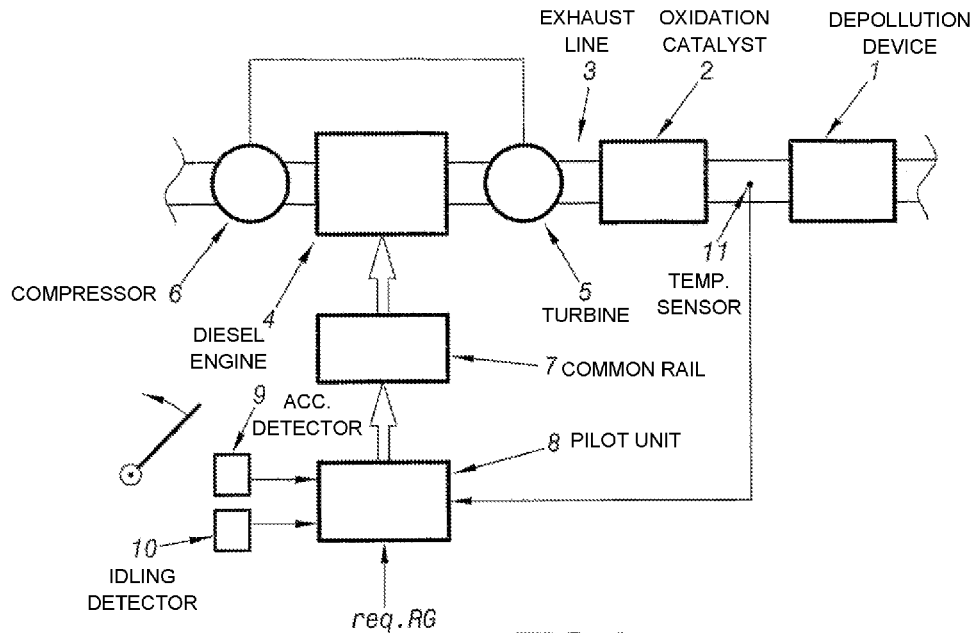
FIG. 1 is a block diagram showing the general structure of a regeneration assistance system of the invention.

FIG. 1 shows the general structure of a system for providing assistance in the regeneration of depollution means, given overall reference 1 in the figure, and associated with oxidation catalyst-forming means given overall reference 2, integrated in an exhaust line 3 of a diesel engine 4 of a motor vehicle.

The engine may be associated with a turbocharger, in which case the turbine portion 5 thereof is likewise associated with the exhaust line, while the compressor portion 6 of the turbocharger is placed upstream from the engine.

Furthermore, the engine is also associated with means 7 forming a common rail for feeding fuel to the cylinders of the engine and adapted, at constant torque, to implement a strategy of regeneration by injecting fuel into the cylinders in at least one post-injection operation in conventional manner.

These means are controlled by a pilot unit given overall reference 8, that is adapted to detect a request for regeneration req.RG, e.g. delivered by a supervisor of the depollution means, and thus constituting a request for post-injection, the pilot unit also being connected to means 9 for detecting that the vehicle accelerator pedal is being raised and to means given overall reference 10 for detecting a stage during which the engine is idling.

These means may present any suitable structure.

Furthermore, the pilot unit 8 is also connected to means for acquiring the temperature downstream from the catalyst-forming means 2, these acquisition means being given overall reference 11.

These means comprise any suitable temperature sensor.

Figure 2:
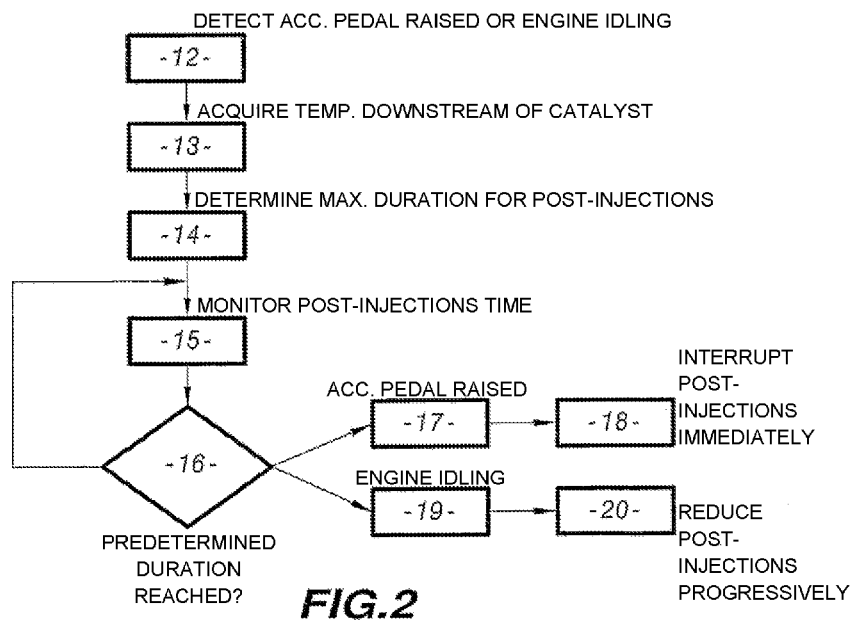
FIG. 2 is a flow chart showing the operation thereof.

Thus, on detecting a request for regeneration and thus for post-injection, the pilot unit 8 can detect that the vehicle accelerator pedal is being raised or that the vehicle engine is idling, as represented by step 12 in FIG. 2;

The unit 8 is then adapted to acquire the temperature downstream from the catalyst-forming means during a step 13 in order to respond to said temperature by determining, during a step 14, a maximum duration for applying post-injections while the engine is returning to idling as a result of the accelerator pedal being raised, or while the engine is idling.

During steps 15 and 16, the unit 8 monitors the time during which post-injections are being used, and detects the moment when said length of time reaches the predetermined maximum duration for the application of post-injections.

If this duration reaches the predetermined maximum application duration while the engine is returning to idling as a result of the accelerator pedal being raised, as represented by step 17, then the pilot unit 8 is adapted to interrupt the or each post-injection immediately, as illustrated by step 18.

Otherwise, if the duration of utilization reaches the predetermined maximum application duration while the engine is idling, as represented by step 19, then the pilot unit is adapted, in a step 20, to reduce the or each post-injection progressively in application of a slope, e.g. a slope that can be calibrated.

It should also be observed that such a system can operate with depollution means constituted by a particle filter, or a NOx trap, and that an additive may also be mixed with the fuel in conventional manner for deposition, together with the particles with which it is mixed, on the depollution means in order to facilitate regeneration thereof by reducing the combustion temperature of the soot trapped therein.

In conventional manner, the additive is present in the particles after the additive-containing fuel has been burnt in the engine.

It is also possible to envisage using an additive that forms a NOx trap.

It will be understood that such a structure enables post-injections to be applied for a maximum duration during stages of idling or while the accelerator pedal is being raised.

This maximum duration is presented in the form of a timer that empties, i.e. counts down or decrements with increasing time spent in stages of idling and/or of the accelerator pedal being raised, and while also in a regeneration stage. The timer is reinitialized after these stages have come to an end.

The system makes it possible to limit the quantity of fuel that is post-injected during stages in which the accelerator pedal is being raised or the engine is idling while the temperature levels in the exhaust line are the most unfavorable.

By limiting in this way the total quantity of fuel that is post-injected during these stages, which in any event are not the most effective stages from the point of view of regenerating the depollution means, the proportion of effective post-injection time is optimized and the extent to which the engine lubricating oil is diluted by fuel is limited.

Finally, this also makes it possible to limit the risk of the oxidation function suddenly ceasing to be active, which would lead to a deficit in HC conversion and thus to a puff of HCs from the exhaust that could lead to the generation of smoke and/or odors.

Naturally, other embodiments could be envisaged.

Thus, for example, the depollution means and the oxidation catalyst-forming means could be integrated in a single element, and in particular on a common substrate.

By way of example, a particle filter integrating the oxidation function could be envisaged.

Similarly, a NOx trap integrating such an oxidation function could also be envisaged, whether the trap is in the form of an additive or otherwise.

The oxidation function and/or the NOx trap function could be performed by an additive mixed with the fuel, for example.

The invention claimed is:

1. A system for providing assistance in regenerating depollution means associated with oxidation catalyst-forming means integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one post-injection, the system comprising:

means for detecting a request for regeneration, and thus for post-injection;

means for detecting a stage in which the vehicle accelerator pedal is being raised and for detecting a stage in which the vehicle engine is idling;

acquisition means for acquiring the temperature downstream from the catalyst-forming means;

means for responding to said temperature to determine a maximum duration of post-injection application during stages in which the engine is returning to idling as a result of the accelerator pedal being raised and stages during which the engine is idling; and means for immediately interrupting the or each post-injection if the duration of post-injection utilization reaches the predetermined maximum duration of application during a stage of returning to idling, and for progressively reducing the or each post-injection when the duration of post-injection utilization reaches the predetermined maximum duration of application during a stage of the engine idling.

2. A system according to claim 1, wherein the reduction means are adapted to reduce the or each post-injection in application of a calibratable slope.

3. A system according to claim 1, wherein the depollution means comprise a particle filter.

4. A system according to claim 1, wherein the depollution means comprise a NOx trap.

5. A system according to claim 1, wherein the fuel includes an additive for being deposited together with the particles with which it is mixed on the depollution means in order to facilitate regeneration thereof.

6. A system according to claim 1, wherein the fuel includes an additive that forms a NOx trap.

7. A system according to claim 1, wherein the engine is associated with a turbocharger.

8. A method of providing assistance in regenerating a depollution device associated with an oxidation catalyst integrated in an exhaust line of a motor vehicle diesel engine, and in which the engine is associated with a common rail for feeding fuel to the cylinders of the engine and adapted, at constant torque, to implement a strategy of regeneration by injecting fuel into the cylinders in at least one post-injection, e method comprising:

- detecting a request for regeneration, and thus for post-injection;
- detecting any of (i) a stage in which the vehicle accelerator pedal is being raised, and (ii) a stage in which the vehicle engine is idling;
- acquiring the temperature downstream from the catalyst;
- responding to said temperature to determine a maximum duration of post-injection application during stages in which the engine is returning to idling as a result of the accelerator pedal being raised and stages during which the engine is idling; and
- (i) immediately interrupting the or each post-injection if the duration of post-injection utilization reaches the predetermined maximum duration of application during a stage of returning to idling, and (ii) progressively reducing the or each post-injection when the duration of post-injection utilization reaches the predetermined maximum duration of application during a stage of the engine idling.

9. A method according to claim 8, wherein the or each post-injection are reduced in application of a calibratable slope.

10. A method according to claim 8, wherein the depollution device comprise a particle filter.

11. A method according to claim 8, wherein the depollution device comprise a NOx trap.

12. A method according to claim 8, wherein the fuel includes an additive for being deposited together with the particles with which it is mixed on the depollution device in order to facilitate regeneration thereof.

13. A method according to claim 8, wherein the fuel includes an additive that forms a NOx trap.

14. A method according to claim 8, wherein the engine is associated with a turbocharger.

15. A method according to claim 8, wherein the maximum duration of post-injection is calculated using a timer that decrements with increasing time spent in both (i) stages of any of idling and the accelerator pedal being raised, and (ii) regeneration stage.

16. A system according to claim 1, wherein the maximum duration of post-injection is calculated using a timer that decrements with increasing time spent in both (i) stages of any of idling and the accelerator pedal being raised, and (ii) regeneration stage.

* * * * *